(12) United States Patent
Hell

(10) Patent No.: US 7,513,152 B2
(45) Date of Patent: Apr. 7, 2009

(54) CONTAINER ARRANGEMENT WITH A LEVEL SENSOR, AND A LEVEL SENSOR FOR A CONTAINER ARRANGEMENT

(75) Inventor: Roland Hell, Riedisheim (FR)

(73) Assignee: Vega Grieshaber KG, Schiltach (DE)

( * ) Notice: Subject to any disclaimer, the term of this patent is extended or adjusted under 35 U.S.C. 154(b) by 279 days.

(21) Appl. No.: 11/362,505

(22) Filed: Feb. 27, 2006

(65) Prior Publication Data

US 2006/0196262 A1 Sep. 7, 2006

Related U.S. Application Data

(60) Provisional application No. 60/720,470, filed on Sep. 27, 2005.

(30) Foreign Application Priority Data

Mar. 4, 2005 (DE) .................. 10 2005 010 577

(51) Int. Cl.
G01F 23/00 (2006.01)
(52) U.S. Cl. .................................... 73/290 V
(58) Field of Classification Search ................ 73/290 V
See application file for complete search history.

(56) References Cited

U.S. PATENT DOCUMENTS 3,889,523 A * 6/1975 Nolte .......................... 73/49.2
5,251,482 A * 10/1993 Bates et al. ................ 73/290 V
6,598,474 B2 * 7/2003 Purpura et al. ............ 73/290 V
7,255,002 B2 * 8/2007 Gravel et al. .............. 73/290 V

FOREIGN PATENT DOCUMENTS

DE 296 22 430 U1 4/1997
JP 01250827 A 10/1989

* cited by examiner

Primary Examiner—Hezron Williams
Assistant Examiner—Rodney T Frank
(74) Attorney, Agent, or Firm—The Nath Law Group; Jerald L. Meyer; Sungyeop Chung

(57) ABSTRACT

The invention relates to a container arrangement with a level sensor, with
- a container (1), which can be filled with a medium
- a measuring hole (4) in the top wall (9) of the container (1), and
- the level sensor (8) with an antenna (12), such that in one measuring position at least a portion of the antenna (12) projects through the measuring hole (4) into the container (1), and
- a tube (7) extends upward from the top wall (9) of the container (1) and around the measuring hole (4), and the level sensor (8) is lowered through the tube (7) into the measuring position.

13 Claims, 3 Drawing Sheets

Figure 1:
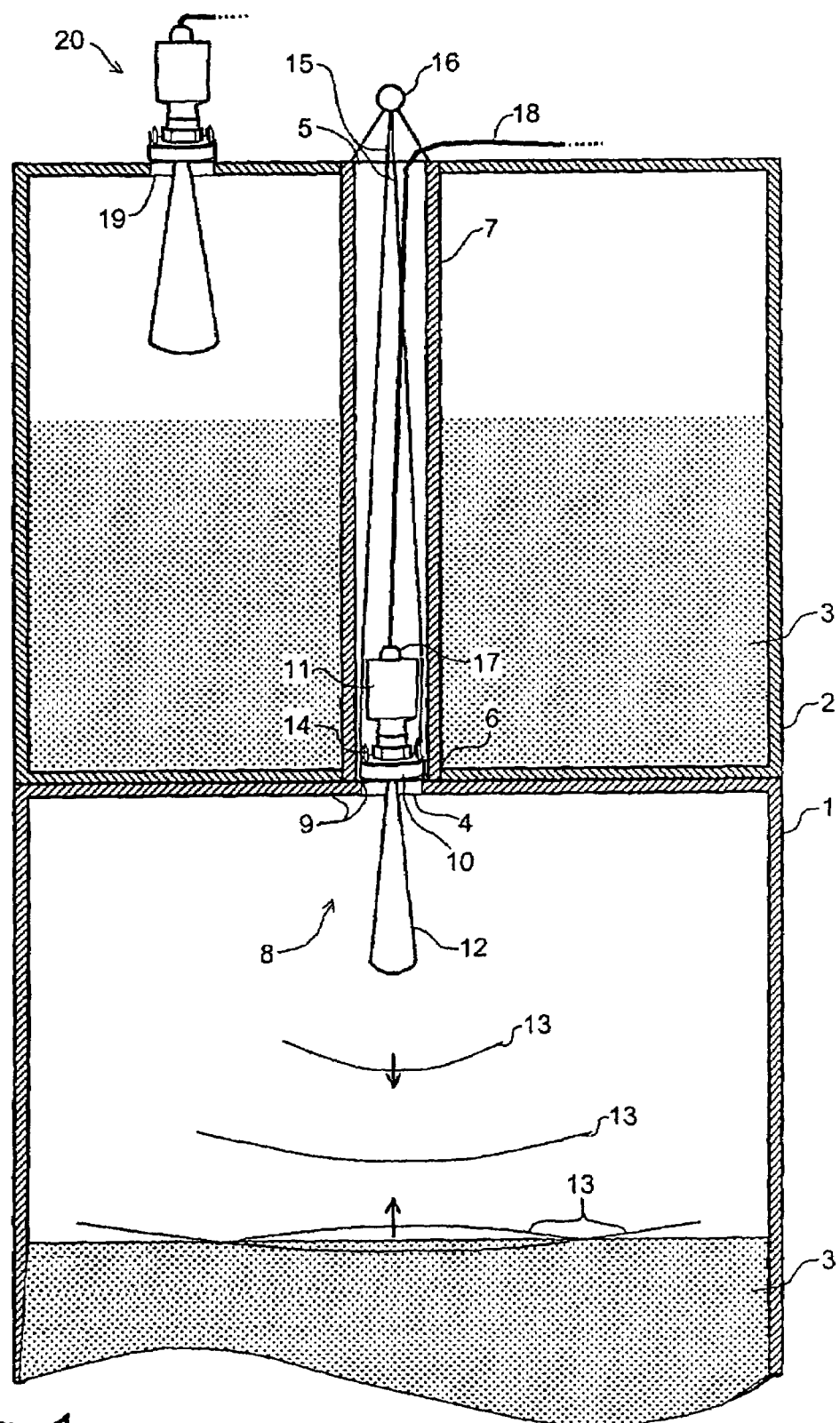

CONTAINER ARRANGEMENT WITH A LEVEL SENSOR, AND A LEVEL SENSOR FOR A CONTAINER ARRANGEMENT

This application claims the benefit of prior U.S. provisional patent application serial number 60/720,470 filed on September 27, 2005, the contents of which are hereby incorporated by reference in their entirety.

The invention relates to a container arrangement with a level sensor, in accordance with the features indicated in the preamble of claim 1, and to a level sensor with the features indicated in the preamble of claim 8.

In the effective utilization of storage space, two or more containers are often stacked on top of each other. The containers serve to store a medium, for example, a liquid or a powder. According to need, the medium can be advantageously removed or filled from the stacked containers through corresponding holes for refilling. Radar level sensors serve to measure the level of fill of the given containers. On its top side the upper container exhibits a hole, and in this hole a radar level sensor can be installed in conventional fashion. The lower of the two stacked containers is also accessible from above through a corresponding measuring hole. A tube runs upwards from the measuring hole of the lower container through the upper container and has a diameter of, e.g., about 100 mm. Measurement with a radar level sensor is not possible from the top of the tube, however, since the wave propagation speed of the radar waves is different in a narrow tube than in the container of the level sensor. A configuration of this kind would require a complicated correction in measurement, one that would involve calculating the influence of the tube from the tube's geometrical data, as specific to the application. This option is usually excluded due to the considerable degree of expenditure it demands. A further disadvantage attached to such a configuration rests in the fact that an echo signal reflected from the filling material or the medium in the lower container will barely strike the small tube opening, and if it does, only a negligibly small echo signal will find its way back through the tube to the antenna.

To solve this set of problems a radar level sensor is employed in which an elongated intermediate component is positioned between the sensor housing and the sensor antenna. Lengths that are often 9 m or more for such an extended intermediate component make this kind of measuring configuration a very laborious and expensive one.

The goal of the invention is to propose an improved container arrangement containing a level sensor, as well as to propose a level sensor for this kind of container arrangement such that an antenna belonging to the level sensor permits successful wave propagation to and from to the surface of the medium, while the assembly and manufacturing costs for the level sensor remain small.

This problem is solved by a container arrangement, including a level sensor, which exhibits the features of patent claim 1, and by a level sensor for such a container arrangement which exhibits the features of patent claim 8. Advantageous embodiments are the subject matter of dependent claims.

Particularly preferred is a container arrangement including a level sensor, with a container which can be filled with a medium, with a measuring hole in a top wall of the container, and with the level sensor which includes an antenna, such that in one measuring position at least a portion of the antenna projects through the measuring hole, and such that a tube extends upwards through the top wall of the container wall to enclose the measuring hole, and such that the level sensor is lowered through the tube into the measuring position.

Particularly preferred is a container arrangement with at least one upper supporting element inside or beneath the tube, for positioning a portion of the level sensor when the latter is in measuring position.

Particularly preferred is a container arrangement with a support means, specifically at least one cord, at least one wire, at least one chain and/or one connecting cable as the support means for lowering the level sensor into the measuring position, and for holding the level sensor in the measuring position, and/or for lifting the level sensor from the measuring position.

Particularly preferred is a container arrangement with a fastening for the support means, in order to secure the support means so that the level sensor is kept in the measuring position.

Particularly preferred is a container arrangement in which the tube runs through at least one other container above the given container.

Particularly preferred is a container arrangement in which the tube is so designed as to screen out measuring signals from another level sensor above and outside of the tube.

Particularly preferred is a container arrangement in which the tube has a diameter from 7 cm to 15 cm, particularly 9 cm to 11 cm.

Particularly preferred is a level sensor for a container arrangement, with a housing and with an antenna that projects downward below the housing for the transmission and reception of measuring signals, particularly radar measuring signals, such that at least one fastening element is provided for fastening a support means used to lower, carry, and/or lift the level sensor, starting from a point above the housing.

Particularly preferred is a level sensor with a flange on the housing, or between the housing and the antenna, such that the flange has dimensions that permit it to be positioned on a support element, particularly on a top wall of the container, and to encompass a measuring hole in one container.

Particularly preferred is a level sensor with a flange on the housing, or between the housing and the antenna, such that the flange has an outer circumference which precisely fits the inner circumference of a measuring hole in one container.

Particularly preferred is a level sensor with one or more eyelets positioned on the housing as fastening elements, or positioned on a housing flange or on a flange between the housing and the antenna, which eyelets serve to fasten the support means, particularly to fasten a cord, wire, or chain serving as the support means.

Particularly preferred is a level sensor such that at least two of the fastening elements are positioned on the housing and/or flange in such a way that the housing and/or the antenna can be oriented relative to the measuring signal's direction of emission or direction of reception.

Particularly preferred is a level sensor with a connecting cable for connecting the level sensor to a signal transmitting circuit and /or a signal receiving circuit, such that the attachment cable is designed and dimensioned as the support means.

Particularly preferred is a level sensor with a pull relief feature between the housing and the connecting cable, for the relief of individual conductors of the connecting cable inside the housing.

Figure 2:
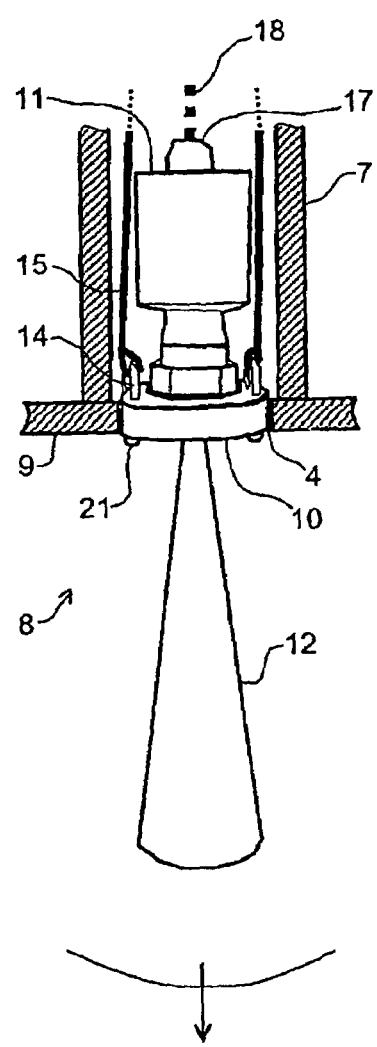
Figure 3:
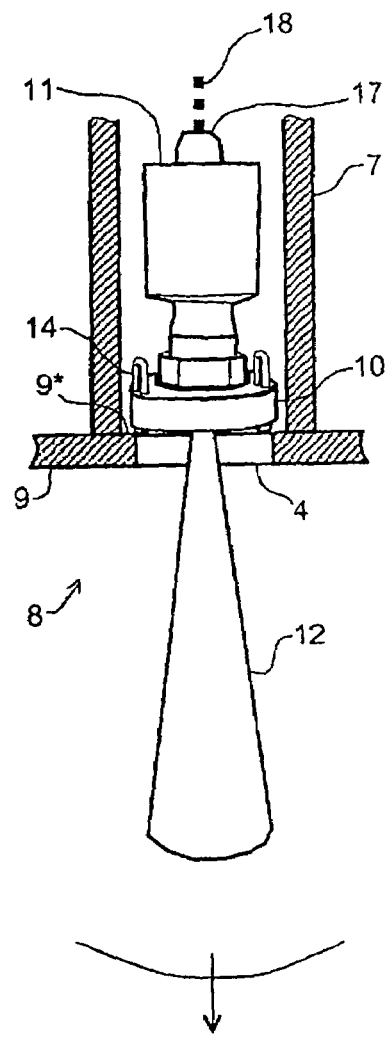
Figure 4:
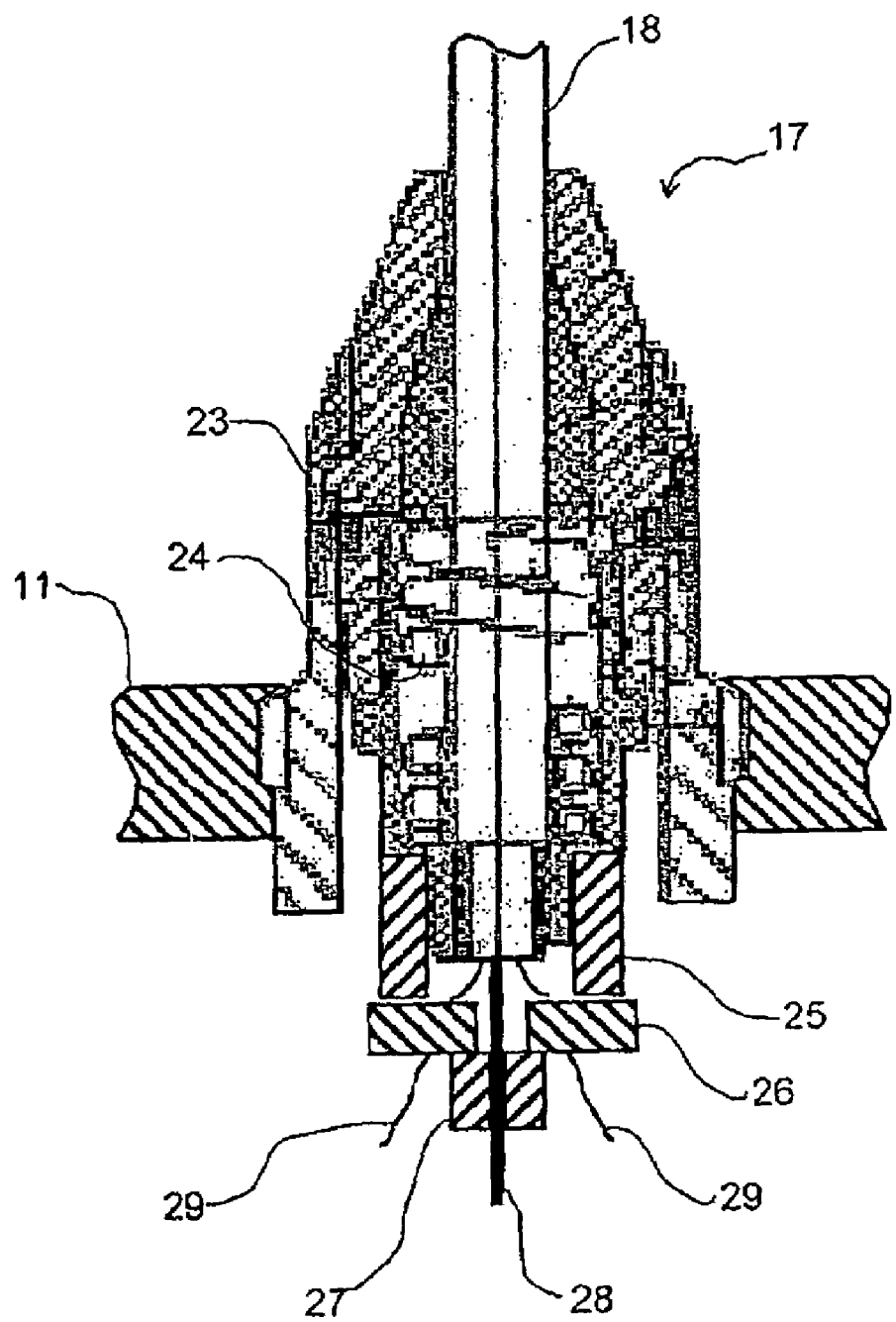

An exemplary embodiment is next described in greater detail on the basis of the drawing. Shown are:

FIG. 1 a partial section through two containers stacked on top of each other, with level sensors FIG. 2 an enlarged section of the same arrangement, with a level sensor according to an initial embodiment FIG. 3 a corresponding section, with a level sensor in a second embodiment FIG. 4 a section from a pull relief feature for fastening a support means to the level sensor.

As can be seen in FIG. 1, two containers 1, 2 are stacked one on top of the other. These containers 1, 2 contain a medium 3. The medium 3 may be, e.g., a liquid or it may be a material in powder form, which can be removed from the containers 1, 2 while they are a stacked condition, or can be filled into them. The level of the medium 3 in both the lower and upper container 1, 2 may vary.

To determine the level of the medium 3 a measuring hole 4 is formed in the top wall 9 of the lower container (1). A floor hole is formed in the bottom wall of the upper container 2, and a through-hole 5 is formed in the top wall of the container 2. A tube 7 passes through the through-hole 5 and the floor hole 6, and the transitional area of the tube 7 at the wall of the floor opening 6 is so formed that the medium 3 cannot pass from the upper container 2 between the two. The tube 7 may be of any desired cross-section.

To measure the level of the medium 3 in the lower container 1 there is provided a level sensor 8, which is lowered through the tube 7 into a measuring position with the aid of a support means 15. Simple measures assure that an antenna 12 positioned on the lower side of the housing 11 of the level sensor 8 projects through the measuring hole 4 in the lower container 1 and into the container 1 itself.

The level sensor 8 can thus be conventional in its basic design. The depicted level sensor 8 consists of the housing 11, the antenna 12, and a flange 10 positioned between the two. The flange 10 will ideally have an outer diameter which permits the measuring hole 4 to be sealed upwards into the tube 7. When the measuring hole 4 is formed by the side walls of the container 1—i.e., when the container 1 has no top wall—the flange 10 will ideally have an outer diameter that matches the inner diameter of the tube 7.

In customary fashion the upper container 2 also exhibits a measuring hole 19 in its top wall, and the antenna of another level sensor 20 is guided through this measuring hole 19 in the upper container 2. To avoid interference signals caused by this second level sensor 20, the tube 7 will be advantageously produced from a suitable shielding material, or prepared with the application of a suitable shielding material, such that radar signals from the second level sensor 20 are unable to penetrate the tube 7. Shielded and undisturbed measurement with the level sensor 8 is thereby permitted in the lower container 1. As depicted, the level sensor 8 may be positioned in off-center fashion in the containers 1, 2.

FIG. 2 gives an enlarged view of an initial embodiment of this kind of level sensor, in a preferred measuring position. The flange 10 has an outer circumference which will ideally have dimensions that precisely match the inner circumference of the measuring hole 4 and/or the inner circumference of the tube 7. In this way, the level sensor 8 can be lowered into a measuring position in which the flange 10 seals the measuring hole 4. Two cords, wires, or chains are provided as support means 15 to lower the level sensor 8 and to hold it in measuring position. Eyelets 14, which are secured to the flange 10, may serve to fasten the support means 15 to the level sensor 8. In this kind of arrangement the eyelets may run through the flange 10 and be fastened on the lower side of the flange by opposing elements 21. As an alternative or an addition thereto, corresponding eyelets or fastening elements 14 may be positioned on, e.g., the housing 11. In this arrangement the level sensor 8 is thus freely suspended in or below the tube 7 by the support means 15.

FIG. 3 shows a second preferred embodiment, in which the connecting cable 18 is designed as the support means for lowering and raising the level sensor 8 and is accordingly dimensioned. To relieve pull, a pull relief feature 17 is beneficially provided on the top of the housing 11, where the jacket of the connecting cable 18 is secured. To relieve pull on the connecting cable, which serves as a support means, and/or to optimize the orientation of the level sensor 8 in its measuring position, the outer circumference of the flange 10 is larger than the outer circumference of the measuring hole 4. To the side of the measuring hole 4, the upper edge of the top wall 9 of the container 1 thus provides a support element 9* on which the flange 10 can rest. As an alternative, this support element may be formed, e.g., at the lower terminal section of the tube 7, by allowing the tube's inner diameter to taper and narrow, and thereby support the flange.

Thus, depending on the embodiment, a sensor 8 with eyelets or other fastening elements 14 is so outfitted as to provide for the simple suspension of the sensor 8 from suitable support means 15. Such eyelets may be applied to, e.g., the housing or to a screw-in part of larger diameter that belongs to the level sensor 8 and is provided above a screw thread. Particularly advantageous is an arrangement with two or more support means, e.g., cords which are fastened to the level sensor in such a way that the latter can be swung out and held centrally in the measuring position. A possible alternative is a central suspension, particularly one employing the connecting cable as support means. Thus a level sensor or, as the case may be, a container arrangement with such a level sensor, is provided simply and in a manner that permits easy construction and cost-effective manufacture—inasmuch as a level sensor which is fundamentally conventional in design is lowered through the tube far enough for the antenna to look out through the tube.

FIG. 4 shows a variation for fastening the support means to the housing 11 of the level sensor 8 when said support means takes the form of the connecting cable 18 and employs a pull relief feature 17. The connecting cable 18 contains a steel core 28, which is braced in a clamping sleeve 27. The clamping sleeve is supported in the upward direction by a shim 26, a sleeve 25, and a spring mechanism 24 on the housing 23 of a pull relief feature. The pull relief housing 23 is firmly secured to the housing 11 of the level sensor 8, e.g., by a screw connection. Other fastening possibilities between the housing 11 and the connecting cable 18 are possible as an alternative, e.g., a hook-suspension of the cable jacket or steel core.

The invention claimed is:

1. A container arrangement containing a level sensor, with a container which can be filled with a medium a measuring hole in the top wall of the container, and the level sensor with an antenna, such that in one measuring position at least a portion of the antenna projects through the measuring hole into the container , wherein a tube encompasses the measuring hole and extends upwards from the top wall of the container , and the level sensor is lowered through the tube into its measuring position.

2. A container arrangement according to claim 1, with at least one upper support element inside or below the tube for supporting a part of the level sensor when said sensor is in measuring position.

3. A container arrangement according to claim 1, with a support means , specifically at least one cord, at least one wire, at least one chain and/or one connecting cable serving as the support means for lowering the level sensor into the measuring position, for holding the level sensor in the measuring position, and/or for raising the level sensor from the measuring position.

4. A container arrangement according to claim 3, with a fastener for fastening the support means used to keep the level sensor in the measuring position.

5. A container arrangement according to claim 1, in which the is so designed as to screen out measuring signals from another level sensor above and outside of the tube.

6. A container arrangement according to claim 1, in which the tube has a diameter in a range from 7 cm to 15 cm, particularly 9cm to 11 cm.

7. A level sensor for a container arrangement according to claim 1 with a housing and an antenna, positioned below the housing and projecting downwards, for emitting and/or receiving a measuring signal, particularly a radar measuring signal, wherein at least one fastening element for fastening a support means whose purpose is to lower, support, and/or lift the level sensor, starting from a point outside of the housing.

8. A level sensor according to claim 7, with a flange on the housing, or between the housing and the antenna, such that the flange has dimensions that permit it to be positioned on a support element, particularly on a top wall of the container, and to encompass a measuring hole in a container.

9. A level sensor according to claim 7, with a flange on the housing, or between the housing and the antenna, such that the flange has an outer circumference which is precisely fitted to the inner circumference of a measuring hole in a container.

10. A level sensor according to claim 7, with one or more eyelets positioned on the housing as fastening elements, or positioned on a housing flange or on a flange between the housing and the antenna, which eyelets serve to fasten the support means, particularly to fasten a cord, wire, or chain serving as the support means.

11. A level sensor according to claim 10, where at least two of the fastening elements are so positioned on the housing and/or on the flange that the housing (11) and/or the antenna (12) can be oriented relative to the direction of emission or the direction of the reception of the measuring signal.

12. A level sensor according to claims 7, with a connecting cable for connecting the level sensor to a signal transmitting circuit and/or a signal receiving circuit, such that the connecting cable is designed and dimensioned as the support means.

13. A level sensor according to claim 12, with a pull relief feature between the housing and the connecting cable, for the relief of individual conductors of the connecting cable inside the housing.

\* \* \* \* \*

UNITED STATES PATENT AND TRADEMARK OFFICE
CERTIFICATE OF CORRECTION

PATENT NO. : 7,513,152 B2
APPLICATION NO. : 11/362505
DATED : April 7, 2009
INVENTOR(S) : Roland Hell It is certified that error appears in the above-identified patent and that said Letters Patent is hereby corrected as shown below:

Claim 1, Column 4, Line 51,

Please delete "with a medium a measuring"
and
replace with

-- with a medium, a measuring --

Claim 1, Column 4, Line 59,

Please delete "measuring position."
and
replace with

-- measuring position, wherein the tube runs through at least one other container positioned above the container. --

Claim 5, Column 5, Line 8,

Please delete "the is"
and
replace with

-- the tube is --

UNITED STATES PATENT AND TRADEMARK OFFICE
CERTIFICATE OF CORRECTION

PATENT NO. : 7,513,152 B2
APPLICATION NO. : 11/362505
DATED : April 7, 2009
INVENTOR(S) : Roland Hell It is certified that error appears in the above-identified patent and that said Letters Patent is hereby corrected as shown below:

Claim 11, Column 6, Line 13,

Please delete "housing (11) and/or"
and
replace with

-- housing and/or --

Claim 11, Column 6, Lines 13-14,

Please delete "antenna (12) can"
and
replace with

-- antenna can --

Claim 12, Column 6, Line 16,

Please delete "claims 7,"
and
replace with

-- claim 7, --

Signed and Sealed this

Sixteenth Day of June, 2009

JOHN DOLL
*Acting Director of the United States Patent and Trademark Office*